United States Patent
Van Zijderveld et al.

(10) Patent No.: US 6,227,356 B1
(45) Date of Patent: May 8, 2001

(54) CONVEYOR MAT AND CONVEYING APPARATUS

(75) Inventors: George Johannes Van Zijderveld, 's-Gravenzande; Franciscus Josephus Maria Van Esch, Breda, both of (NL)

(73) Assignee: MCC Nederland B.V. (NL)

( * ) Notice: Subject to any disclaimer, the term of this patent is extended or adjusted under 35 U.S.C. 154(b) by 0 days.

(21) Appl. No.: 09/268,184

(22) Filed: Mar. 15, 1999

(30) Foreign Application Priority Data

Mar. 16, 1998 (NL) .................................................. 1008600
Sep. 9, 1998 (NL) .................................................. 1010042

(51) Int. Cl.⁷ .................................................. B65G 15/62
(52) U.S. Cl. .......................................... 198/850; 198/853
(58) Field of Search .................................. 198/853, 841, 198/840

(56) References Cited

U.S. PATENT DOCUMENTS

| | | | |
|---|---|---|---|
| D. 427,898 | * 7/2000 | Loh | D8/499 |
| 4,576,277 | * 3/1986 | Part et al. | 198/803.01 |
| 4,742,907 | * 5/1988 | Palmaer | 198/831 |
| 4,858,753 | * 8/1989 | Hodlewsky | 198/853 |
| 4,953,693 | * 9/1990 | Draebel | 198/853 |
| 4,993,543 | * 2/1991 | Lapeyre | 198/834 |
| 5,372,248 | 12/1994 | Horton . | |
| 5,586,643 | * 12/1996 | Zabron et al. | 198/853 |
| 5,601,180 | * 2/1997 | Steeber et al. | 198/502.1 |
| 5,678,682 | * 10/1997 | Van Zijderveld | 198/853 |
| 5,706,934 | * 1/1998 | Palmaer et al. | 198/853 |
| 5,779,027 | * 7/1998 | Ensch et al. | 198/841 |
| 5,782,340 | * 7/1998 | Dolan | 198/841 |
| 5,816,390 | * 10/1998 | Stebnecki | 198/853 |
| 5,826,705 | * 10/1998 | Ramsey et al. | 198/853 |
| 5,850,902 | * 12/1998 | Hicks et al. | 198/457 |
| 5,899,322 | * 5/1999 | Gamble, Jr. | 198/853 |
| 5,967,296 | * 10/1999 | Dolan | 198/853 |
| 6,050,397 | * 4/2000 | Kato et al. | 198/853 |
| 6,068,112 | * 5/2000 | Kasai et al. | 198/853 |
| 6,073,756 | * 6/2000 | Damkjaer et al. | 198/853 |
| 6,079,543 | * 6/1998 | Palmaer | 198/445 |

FOREIGN PATENT DOCUMENTS 296 11 470 U    10/1996 (DE) .

* cited by examiner

Primary Examiner—Christopher P. Ellis
Assistant Examiner—Rashmi Sharma
(74) Attorney, Agent, or Firm—Varnum, Riddering, Schmidt & Howlett LLP

(57) ABSTRACT

A conveyor mat for conveying products in a conveying direction between at least two divert wheels. The conveyor mat comprises a number of rows of side-by-side modules succeeding each other in the conveying direction and extending transversely to the conveying direction. Incorporated into the conveyor mat are a number of guide modules which have their bottom side provided with guide members for cooperation with a guide provided on a conveying track. According to the invention, the guide modules are incorporated into the conveyor mat so as to be substantially equally spaced from one of the lateral edges thereof, such that the guide members together constitute one narrow, slotted guide track extending in conveying direction. In an advantageous manner, the guide modules can be incorporated adjacent a lateral edge of the conveyor mat or in or adjacent the center of the conveyor mat.

11 Claims, 9 Drawing Sheets

CONVEYOR MAT AND CONVEYING APPARATUS

BACKGROUND OF THE INVENTION

1. Field of the Invention

The invention relates to a conveyor mat for conveying products in a conveying direction between at least two divert wheels, comprising a number of rows of side-by-side modules succeeding each other in the conveying direction and extending transversely to the conveying direction, which modules, viewed in conveying direction, each have their front and rear sides provided with hinge loops, the hinge loops of said successive rows of modules cooperating and being coupled by means of hinge pins extending transversely to the conveying direction, such that the top faces of the modules together constitute a conveying face, into which conveyor mat a number of guide modules are incorporated which have their bottom side provided with guide members for cooperation with at least one guide provided on a conveying track.

2. Description of Related Art

Such conveyor mats are known and are used for conveying all types of products in a large number of different environments. The conveyor mat often constitutes an endless belt traveling around between two groups of divert wheels, the conveying face being supported by a conveying track. Usually, the conveyor mat is built up from a large number of plastic modules which are each manufactured by injection molding. During manufacture of the modules, a certain measure of difference between the dimensions of the plastic modules must be allowed for, due to differences in shrinkage or differences between the different mold cavities present in a mold for the purpose of injection molding. In addition, the loop thickness of a module is always less than the space between two loops, to allow the modules to interfit, as a result of which these modules already have a certain play relative to each other during assembly of the conveyor mat. During use, this play may even increase due to wear and stretching of the modules.

Because of this play, the modules of the conveyor mat can slide relative to each other. This inter alia results in a possible width variation of the conveyor mat due to the modules of a row sliding in and out transversely to the conveying direction. Further, because of this, the rows of modules of the conveyor mat may slide back and forth relative to the conveying track, between a position in which either one outer module or the other outer module of a row is located adjacent a lateral edge of the conveying track. In the worst case, this may already cause a width variation of 1%.

In practice, this causes various problems. For instance, the lateral edge of the conveyor mat may rub along a lateral edge of the conveying track, which may lead to wear of and damage to the modules located adjacent the edges of the conveyor mat. This increases the chance of breakage of the conveyor mat. The conveyor mat may be entirely located along one side of the conveying track or zigzag along both lateral edges of the conveying track. Another problem caused by the play between the modules and the rows of the conveyor mat sliding back and forth, is that in practice, the width over which the conveyor mat can be loaded with products must be chosen to be less than the nominal width of the conveyor mat, while the conveying track must be chosen to the greater than the nominal width of the conveyor mat. In particular in the case of long conveying tracks, this may result in high additional costs and substantial loss of space.

To reduce the above problems, it has already been proposed to incorporate into a conveyor mat, adjacent its two lateral edges, modules whose bottom sides are provided with guide projections, each for cooperating with a wear strip extending adjacent a lateral edge of the conveying track. Such a conveyor mat is known from U.S. Pat. No. 5,372,248. One guide projection prevents movement of the conveyor mat in one transverse direction, while the other guide projection prevents movement in the opposite transverse direction. The distance between the guides is selected so that during placement of the conveyor mat on the conveying track, the play in width direction is precisely removed.

In particular, U.S. Pat. No. 5,327,248 describes a flexible conveyor mat whose lateral sides comprise guide modules designed as end modules. The guide modules are incorporated into the conveyor mat in such a manner that the guide members thereof form two guide tracks, each extending adjacent a lateral side of the conveyor mat. The guide members comprise a substantially hook-shaped part which, in a bend, can engage below a guide provided on a guide track, to prevent the conveyor mat from moving up during travel around a bend. The guide members further comprise a substantially block-shaped guide projection which, relative to the hook-shaped part, is located more towards the center of the conveyor mat. The guide projection is intended to cooperate with the guide, in particular when traveling around a bend. One guide projection impedes movement of the conveyor mat in one transverse direction, while the other guide projection prevents movement in the opposite transverse direction.

However, when the play transverse to the conveying direction becomes too great, the effect of such construction becomes lost. In particular, due to the increased play between the wear strip and the guide projection, movement in transverse direction will no longer be sufficiently prevented. In addition, because of the difference in dimensions of the modules, the distance between the guide members of the guide modules may vary per row. This is particularly the case when the rows of the conveyor mat comprise a large number of modules, as in a wide conveyor mat. Further, such a construction cannot be used when the conveyor mat is exposed to substantial changes of temperature and the conveyor mat is built up from modules manufactured from a material having a relatively great coefficient of thermal expansion, such as plastic.

The above problems play a role in particular when a wide conveyor mat built up from plastic modules is subjected to substantial changes of temperature, as in the case where by means of such conveyor mat, products are pasteurized in a pasteurizer. In a usual pasteurizer, products are slowly conveyed over a conveying track by means of a conveyor mat, while the temperature of the products is gradually increased to at least 80° C. in order to kill bacteria present in the products. The conveyor mat has a width that may run up to more than 5 m and a length that may run up to more than 40 m. The great width of the conveyor mat, the substantial changes in temperature and the great coefficient of thermal expansion of plastic (about 0.15 mm/m/° C.), much greater than that of the stainless steel from which the frame of a pasteurizer is made, render the above-mentioned guide construction unsuitable for this application. Instead, the conveying track must be of an extra wide design and be arranged in a very flat position. For the sake of safety, guide blocks are provided adjacent the lateral edges of the conveying track. Such a construction leads to high extra costs and substantial loss of space. Moreover, because of the length of a pasteurizer, sometimes more than 40 m, the lateral guides cannot be made from one piece, which may cause an uneven transition. Finally, pasteurizers are completely inaccessible during operation, so that dragging or jamming of a mat can only be detected on be basis of damages to the mat; at that point, however, it is already too late to take measures to "save" the mat.

SUMMARY OF THE INVENTION

The object of the invention is to provide a conveyor mat, in particular conveyor mat built up from plastic modules for conveying products through a pasteurizer, wherein the above drawbacks are avoided.

To that end, a conveyor mat according to the invention is characterized in that the guide modules are incorporated into the conveyor mat so as to be substantially equally spaced from one of the lateral edges thereof, such that the guide members together constitute one substantially slotted guide track extending in conveying direction.

It is thus provided that the distance between the guide members transverse to the conveying direction is small, which limits the impact of the tolerances and the expansion or shrinkage due to changes of temperature, on the action of the guide. Hence, the conveyor mat can also be guided effectively in the case of substantial play and/or great thermal expansion, which results, inter alia, in a considerable reduction of the difference between the width of the conveying track and the width of the conveying face over which products can be conveyed. This result in a gain of space and a saving on costs.

It is observed that in this context, the phrase "substantially equally spaced from one of the lateral edges thereof" should at least be understood to mean that the difference in distance from the guide members to the lateral edge in successive modules is less than 10% of the width of the conveyor mat, preferably less than 5%. In an advantageous embodiment, the difference in distance between the guide members transverse to the conveying direction is less than or equal to the width of an average module of the conveyor mat.

In a further embodiment, a conveyor mat according to the invention is characterized in that the guide modules are included in the conveyor mat adjacent a lateral edge of the conveyor mat, such that the guide members together constitute a slotted guide track extending adjacent the lateral edge of the conveyor mat. It is thus provided that the position of one lateral edge of the conveyor mat relative to the conveying track is substantially fixed, while expansion can be taken up by movement to or from the other lateral edge of the conveyor belt. This is advantageous in particular when the lateral edge of a conveyor mat is to be accurately positioned, such as when two conveyor belts have to run with their lateral edges in close side-by-side relationship to enable transferring products from one conveyor mat onto the other, transversely to the conveying direction.

In another embodiment, a conveyor mat according to the invention is characterized in that the guide modules are incorporated into the conveyor mat in or adjacent the center of the conveyor mat transverse to the conveying direction, such that the guide members together constitute one slotted guide track extending in or adjacent the center of the conveyor mat. It is thus provided that in or adjacent the center, the conveyor mat has a fixed width position relative to the conveying track. This has the advantage that the maximum distance through which the outer modules slide due to play and/or expansion, is less. In particular in the case of wide conveyor mats subjected to a great weight load, such as a conveyor mat built up from plastic modules for conveying products through a pasteurizer, this may result in a considerable load and/or wear reduction. It is further achieved that the conveyor mat is always located at the center of the conveying track, which reduces the chance of wear of and damage to modules located adjacent the edges of the conveyor mat. Moreover, the guides along the edges of the conveying track may be of smaller design or may even be left out. A further advantage is that the track on the lateral edge of the mat need not be machined so as to be smooth and flowing, since the mat can no longer touch these lateral edges. This is of great practical importance, because it substantially simplifies the design of a pasteurizer. As the position of the mat is now fixed from the center with a lateral play of, for instance, ±2 mm, only the variation in the mat width of ±1%, due to changes of temperature, must be taken into account, and not the lateral displacement due to width variation that is already present during assembly of the mat. Also, the flatness of the conveying track is less critical. Finally, the lateral guides for the products may be placed further outwards, creating a gain of 2–3% of the usable mat surface area.

It is observed that in this context, the phrase "in or adjacent the center of the conveyor mat" should at least be understood to mean that the guide modules, measured from the center of the conveyor mat, are off-center by a distance of less than 25% of the width of the conveyor mat, in particular less than 5% of the width. In this regard, it should also be observed that in practice, because of the modular construction of the conveyor mat and/or the arrangement of the divert wheels on the conveying track, it may be advantageous to incorporate the modules into the conveyor mat in such a manner that the guide track extends slightly off the center of the conveyor mat.

The invention also relates to a conveying apparatus.

Further elaborations of advantageous embodiments of the conveyor mat and conveying apparatus according to the invention are described in the subclaims.

BRIEF DESCRIPTION OF THE DRAWINGS

The invention will be specified with reference to an exemplary embodiment shown in the accompanying drawings. In these drawings.

DETAILED DESCRIPTION

Figure 1:
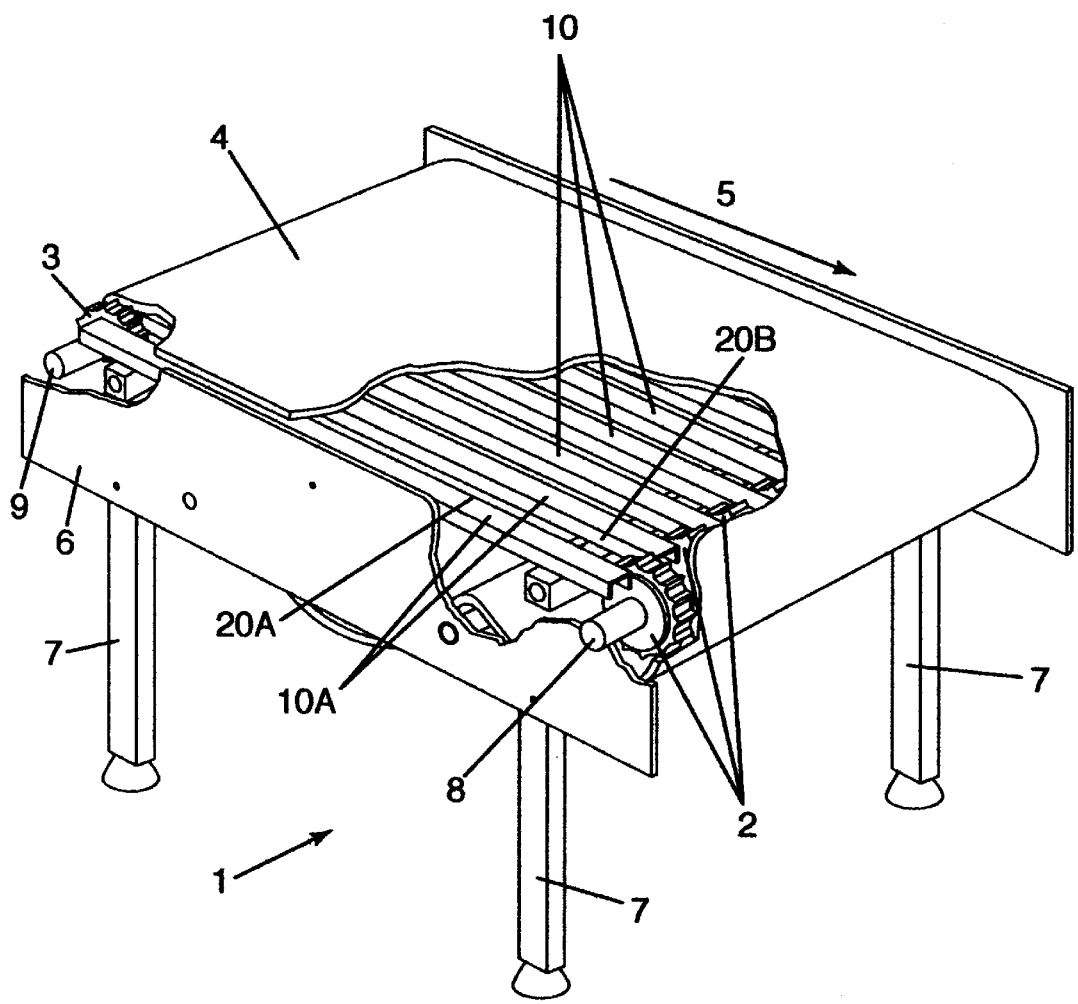
FIG. 1 is a schematic, perspective view of a conveying track.

The Figures are schematic representations of preferred embodiments of the invention and only serve as illustrations.

In the Figures, identical or corresponding parts are designated by the same reference numerals.

FIG. 1 shows a conveying track 1 having an endless conveyor mat 4 extending between driving and returning groups of divert wheels 2 and 3 respectively, for conveying products in a conveying direction 5 indicated by an arrow.

The conveying track 1 comprises a frame 6 disposed on legs 7. Accommodated in the frame 6 are a driven shaft 8 and a free, bearing-mounted shaft 9 on which the driving divert wheels 2 and the returning divert wheels 3 are placed transversely to the conveying direction 5 and with mutual distances in between. Provided between the divert wheels 2, 3 are wear strips 10 extending parallel in conveying direction 5, via which wear strips the conveyor mat 4 rests on the frame 6.

Figure 2:
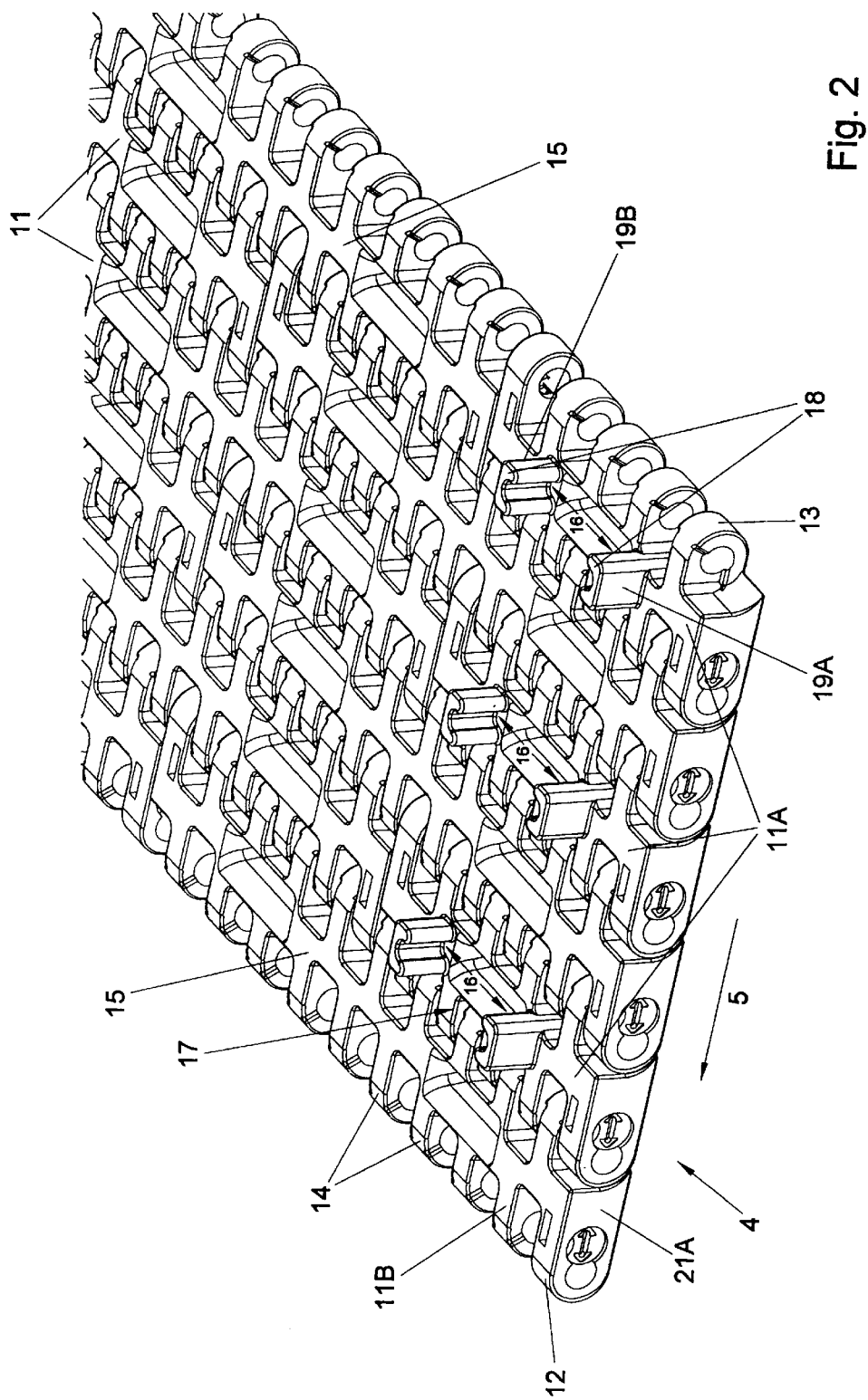
FIG. 2 is a schematic, perspective bottom view of a part of a conveyor mat according to the invention in a first embodiment.

Referring to FIG. 2, the conveyor mat 4 comprises a number of rows of plastic modules 11 located side by side, succeeding each other in conveying direction 5 and extending transversely to the conveying direction 5. Viewed in conveying direction 5, the modules 11 each have their front sides 12 and rear sides 13 provided with hinge loops 14. The hinge loops 14 of modules 11 succeeding each other in conveying direction 5 cooperate and are coupled by means of hinge pins extending transversely to the conveying direction 5, not visible in the Figure. In FIG. 2, only a small portion of the width of the conveyor mat is shown, for the sake of the scale.

In the conveyor mat 4, at an equal distance from the lateral side 21A of the conveyor mat 4, there are included a number of guide modules 11A whose bottom sides 15 are provided with guide members 16, such that the guide members together constitute one narrow guide track 17 extending in conveying direction 5.

In this embodiment, there is included on one lateral edge of the conveyor mat, the lateral edge 21A, one guide module 11A in every other row of modules in conveying direction 5. The guide members 16 comprise, per guide module 11A, two projections 18 extending outwards from the bottom side 15 of the guide module 11A, which projections each cooperate with one wear strip 10A. The projections 18 are positioned between two parallel wear strips of the conveying track 1, such that of each of the projections 18, a guide face 19A and 19B impedes displacement of a wear strip in a transverse direction through cooperation with a corresponding guide face 20A and 20B respectively. Transverse to the conveying direction 5, the distance between the guide members 16, in this embodiment the projections 18, is less than the width of the modules 11, which limits the influence of the play and the expansion or shrinkage due to the changes of temperature on the action of the guide. In this embodiment, the position of the lateral edge 21A of the conveyor mat 4 transverse to the conveying direction 5 is substantially fixed, so that two conveyor belts 4 can be positioned with their lateral edges 21A close together to enable transferring products transversely to the conveying direction 5 from one conveyor mat 4 to the other. Play and expansion can be taken up through displacement towards or from the other lateral edge 21B, not shown in the Figure, of the conveyor belt 4.

Figure 3:
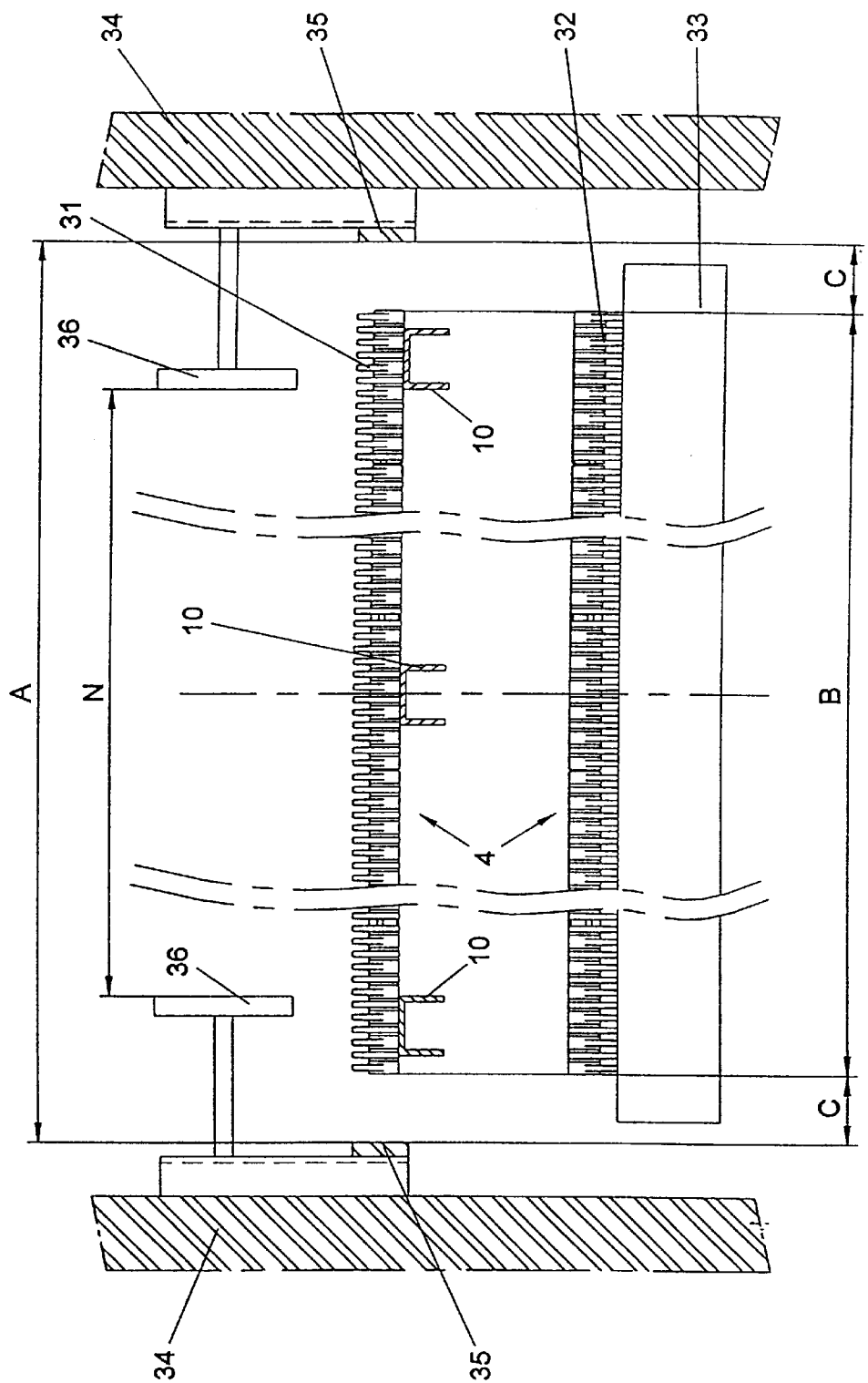
FIG. 3 shows a schematic cross section of a conveying track for a pasteurizer having a conveyor mat according to the prior art.

Referring to FIG. 3, a conveying track 1 (Down in FIG. 1) is shown therein, in cross section, for pasteurizing products in a pasteurizer having a conveyor mat according to the prior art. The conveying track 1 has a length of about 20 m and supports an endless conveyor mat 4 built up from plastic modules 11. The conveyor mat has a nominal width of 4 m and a length of about 40 m. The conveyor mat 4 comprises an upper part 31 on which the products can be placed and a lower part 32 to enable forming the conveyor mat into an endless loop. The upper part 31 and the lower part 32 each move perpendicularly to the plane of the drawing, yet in opposite directions. The upper part 31 is supported by the wear strips 10 of the frame 6 (Down in FIG. 1), while the lower part 32 is supported by support rollers 33.

Adjacent the ends of the conveying track 1, the conveyor mat is diverted by means of divert wheels 2, 3 not shown in FIG. 3. Between the divert wheels 2, 3, the conveyor mat 4 travels through a number of zones where water having per zone a different temperature is sprayed onto the conveyor mat 4 for pasteurizing the products on the conveyor mat 4. The temperature of the water in the different zones may for instance change according to the pattern 40–60–80–60–40° C., so that the conveyor mat 4 between the divert wheels undergoes a difference in temperature of 60° C.

Per minute, for instance 25 l water can be sprayed per m$^2$ of track surface area. The conveying track 1 has at least a portion of its length provided with a tunnel-shaped encasing, of which only the sidewalls 34 are shown in FIG. 3. The conveying track 1 conveys the products at a speed of 0.5–1 m/s and has, for instance, a capacity of about 30–70,000 packages per hour.

Because of the great width of the conveyor mat, the great variation in temperature and the great coefficient of thermal expansion of plastic (about 0.15 mm/m/° C.), no guide construction is used in the prior art. Instead, the conveying track 1 is of extra wide design and arranged in a very flat position. For the sake of safety, guide blocks 35 are arranged adjacent the lateral edges 21 of the conveying track 1. Further, product guides 36 are provided.

Figure 4:
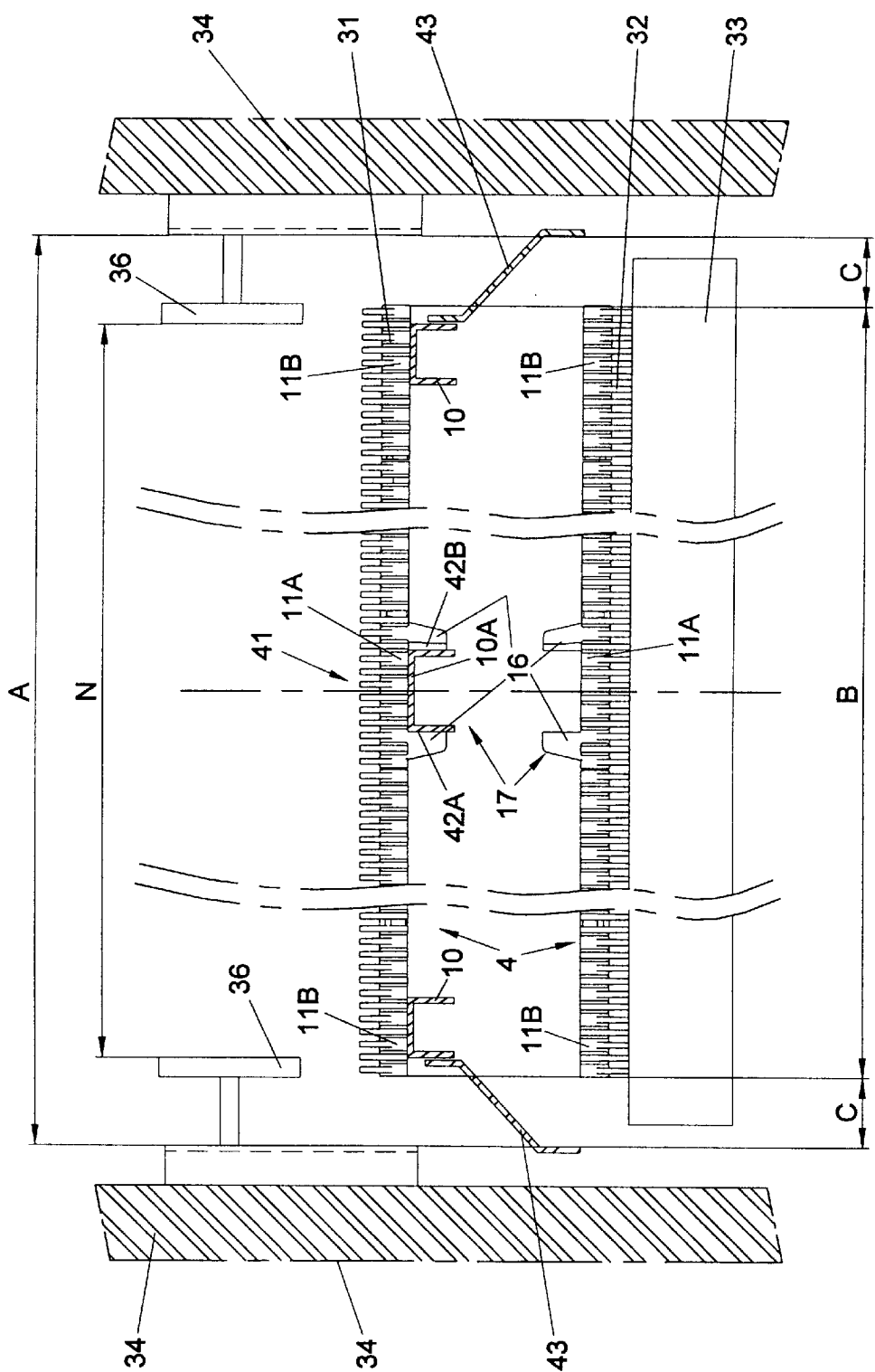
FIG. 4 shows a schematic cross section of a conveying track for a pasteurizer having a conveyor mat according to a second embodiment of the invention.

Referring to FIG. 4, a conveying track 1 is shown therein in cross section, for pasteurizing products in a pasteurizer having a conveyor mat provided with a guide according to the invention. Provided adjacent the center 41 of the conveyor mat 4 are modules 11A having guide members 16 cooperating with a guide 10A, such that the guide members 16 together constitute one guide track 17 extending adjacent the center 41 of the conveyor mat 4. As a result, the conveyor mat 4 has, in width direction, a fixed position relative to the conveying track 1.

It can be calculated that, compared with a conveying track according to the prior art having a width of, for instance, 4 m, in the mat according to the invention, if a coefficient of thermal expansion of 0.15 mm/m/° C. and a ΔT of 60° C. is started from, the effective width, i.e. the distance between the two product guides 36, can chosen to be greater by 160 mm, i.e. by 4%. In other words, for a fixed effective width, a conveying track according to the invention may have a construction which is narrower by 4%.

Moreover, the maximum distance through which the outermost modules 11B slide, due to play and/or expansion, is less. Of a group of divert wheels 2 or 3 (see FIG. 1), the central divert wheel is secured on the shaft 8, 9, while the other divert wheels from the group 2 or 3 can slide along the shaft 8, 9 upon expansion of the conveyor mat 4.

In addition, the conveyor mat 4 is always located at the center of the conveying track 1, which reduces the chance of wear of and damage to modules located adjacent the edges of the conveyor mat. Further, the guide blocks 35 can be omitted. Also, the flatness of the conveying track 4 is less critical. Finally, in a conveying track according to the invention, it is an advantage that the central drive and support wheels no longer need to be secured on both shafts to prevent displacement of the mat, as in the conveying track according to the prior art (FIG. 3). In a conveying track according to the invention, all wheels can slide loosely on the shaft, because the guide members prevent the mat from sliding.

FIG. 4 also shows a guard 43. Here, the guard 43 is designed as two plates of Z-shaped section, extending perpendicularly to the plane of the drawing on either side along the conveying track 1. By means of such guard 43, dirt, in particular abrasive dirt, is prevented from being taken along by the water from the lateral edge of the upper part 31 to the lower part 32. This reduces the chance of damage to the divert wheels 3 when the lower part 32 travels around them. It is observed that such a guard 43 can be constructed in many ways and may also be advantageously applied to conventional conveying tracks and pasteurizers.

Figure 5:
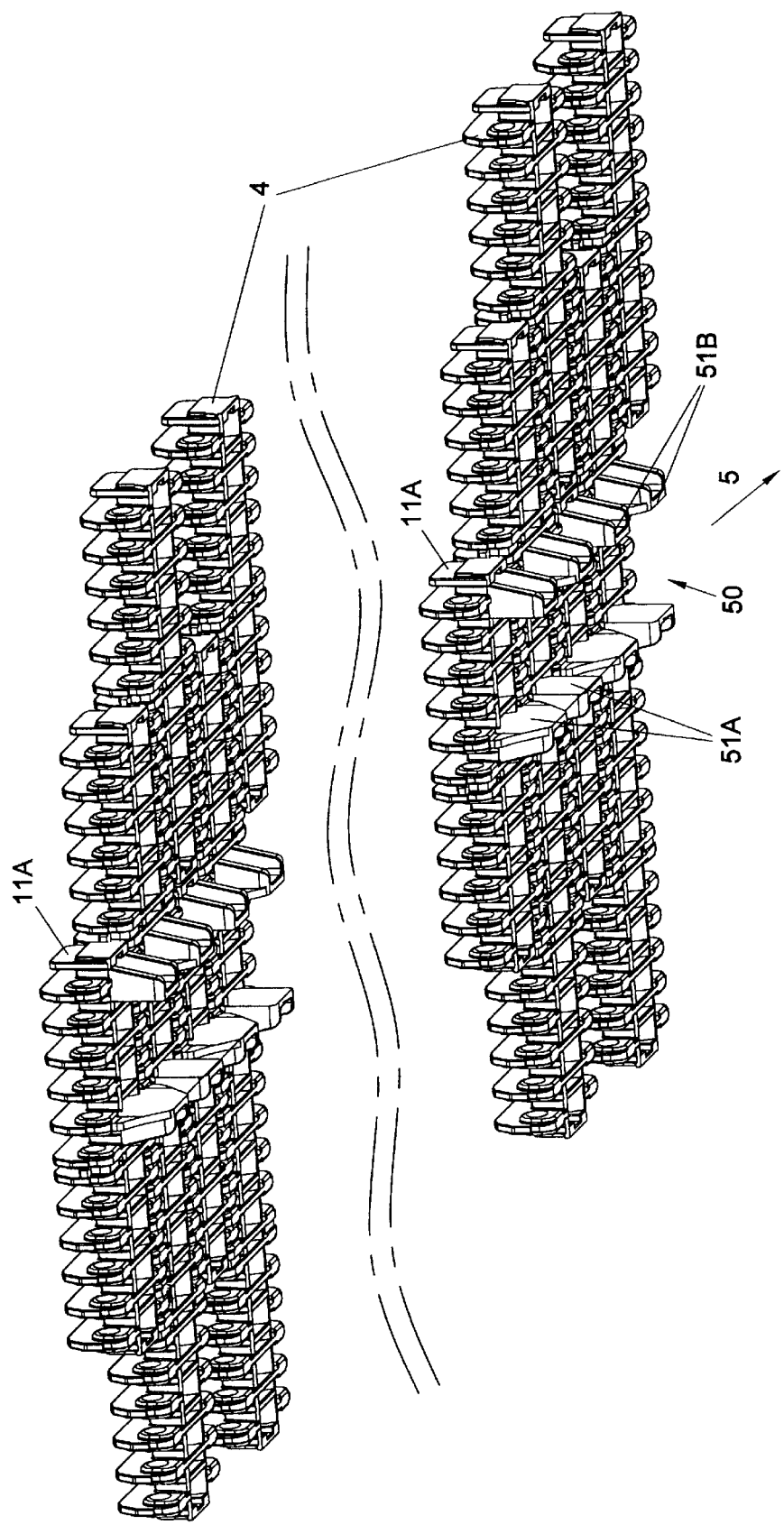
FIG. 5 is a schematic, perspective bottom view of a part of a conveyor mat according to FIG. 4.
Figure 6:
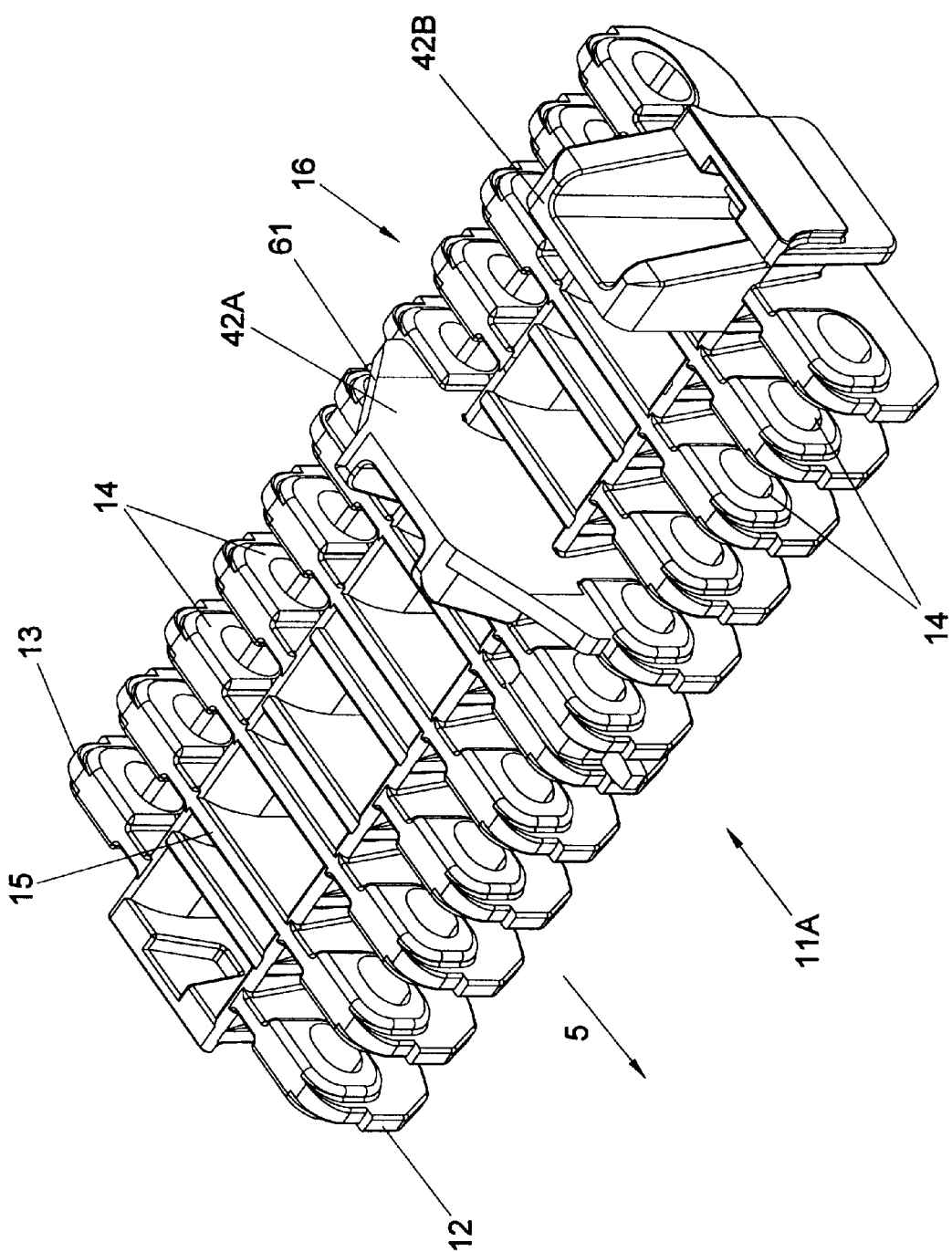
FIG. 6 is a schematic, perspective bottom view of a guide module of the conveyor mat according to FIG. 4.

Referring to FIGS. 5 and 6, in a preferred embodiment of the conveyor mat 4, the guide members 16 are designed as two guide walls 42A and 42B spaced apart transversely to the conveying direction and extending parallel in conveying direction. The distance by which the guide walls 42A and 42B are spaced apart is less than the width of the guide module 4A. The guide walls 42A and 42B project outwards from the bottom side of the guide module 11A and cooperate with a wear strip 10A extending between guide walls 42A and 42B. Preferably, the guide members 42A and 42B together form one channel 50 extending adjacent the center 41 of the conveyor mat 4 in conveying direction 5, which channel has substantially continuous channel walls 51A and 51B (FIG. 5). This has the advantage that the guide surface area cooperating with the wear strip 10A is large, permitting the force that can be transferred to be likewise great. Further, the chance of dirt ending up between the guide member and the wear strip is smaller. This is important in particular in an environment where abrasive particles occur, such as during pasteurization of glass bottles in a glass pasteurizer.

The lengths of the guide walls 42A and 42B in conveying direction 5 are different in the guide module 11A shown in FIG. 6. It is thus provided that when the modules 11 are incorporated into the conveyor mat in the brickstone pattern according to FIG. 7, only one type of guide module 11A is necessary to form a guide track, designed as guide channel 50, having continuous channel walls 51A and 51B.

In two guide modules 11A incorporated into rows succeeding each other in conveying direction, at least one of the guide walls 42A, 42B is provided with a beveled end face 61 extending outwards from the bottom side of the module and towards the center of the guide module 11A. In the embodiment shown in FIGS. 5 and 6, the guide wall 42A has both its end faces provided with a bevel. It is thus provided that the guide walls 42A and 42B release space for successive guide modules 11A for moving towards each other with their bottom sides 15, which facilitates the travel of the conveyor mat around a divert wheel of a slight diameter.

Figure 7:
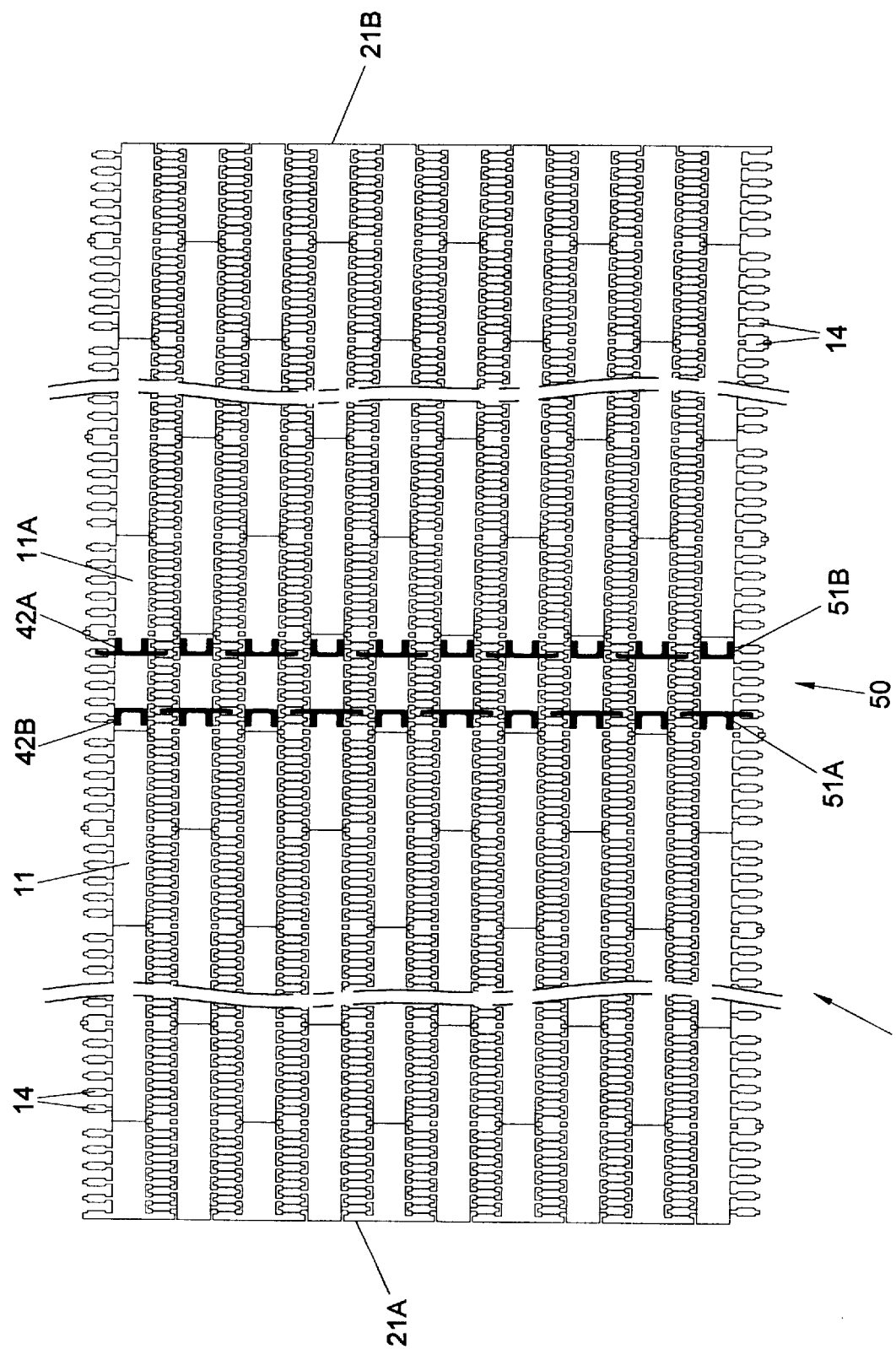
FIG. 7 is a schematic bottom view of a part of the conveyor mat according to FIG. 4.
Figure 8:
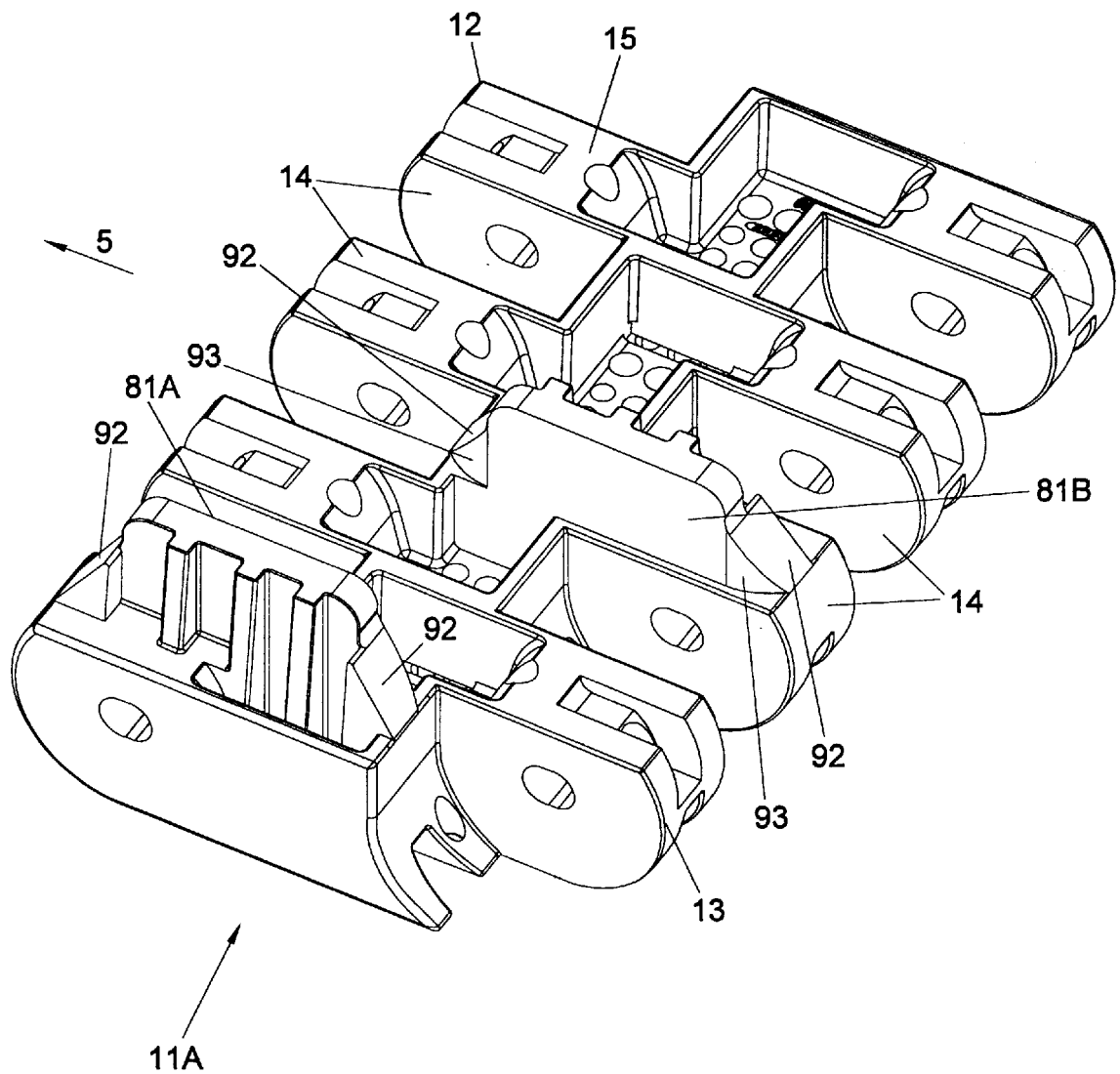
FIG. 8 is a schematic, perspective bottom view of an alternative embodiment of the guide module according to FIG. 6.

Referring to FIG. 8, another embodiment of a guide module 11A is shown therein. In this structural variant, two guide walls 81A and 81B are provided, which, viewed in conveying direction, have substantially equal lengths and are staggered in conveying direction. In this structural variant, when the brickstone pattern shown in FIG. 7 is applied, it is also possible to form a continuous guide channel 50 by means of one type of guide module 11A.

Figure 9:
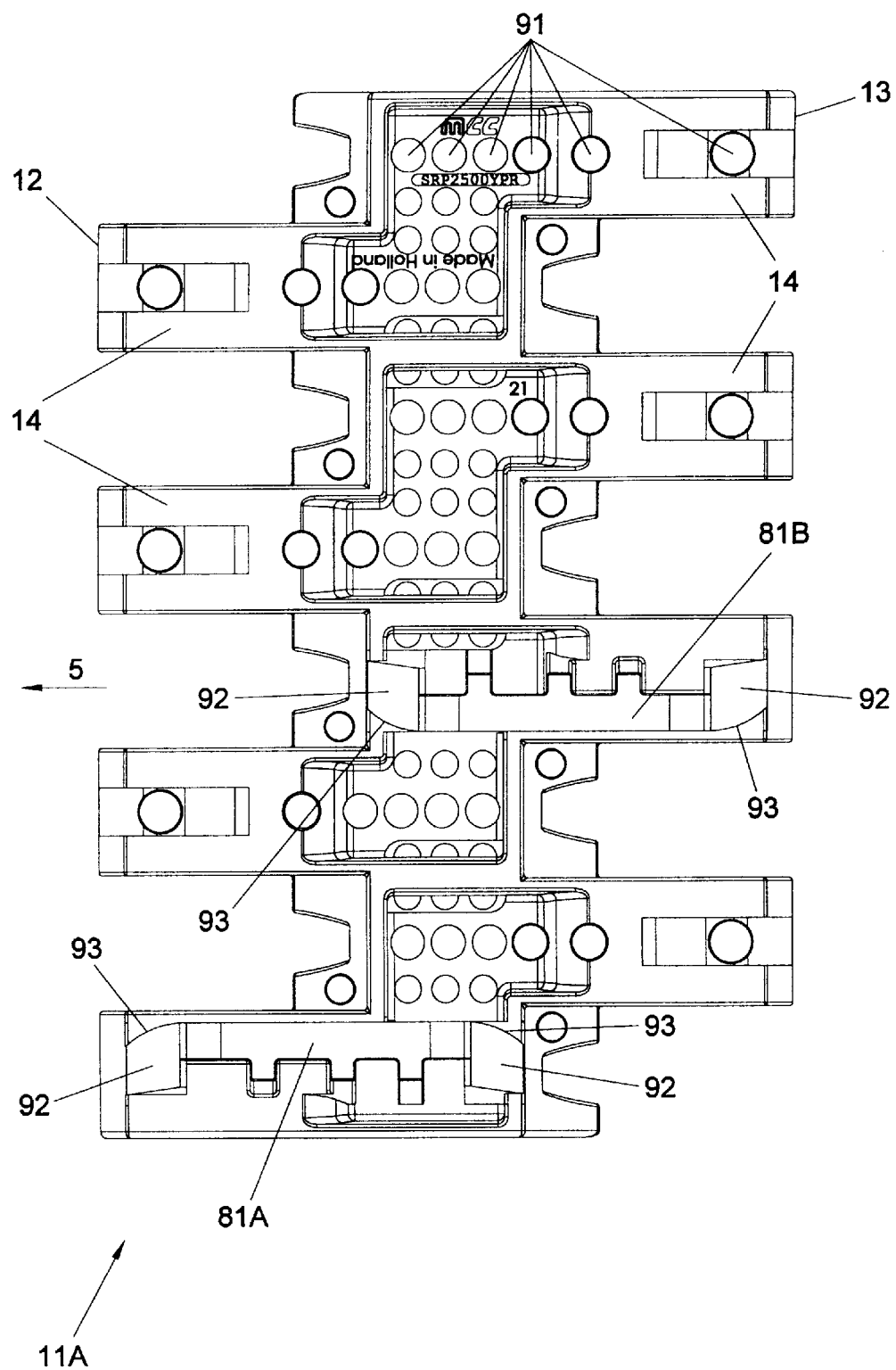
FIG. 9 is a schematic bottom view of the guide module of FIG. 8.

FIG. 9 shows that the guide modules 11A are provided with through openings 91 extending substantially transversely to the conveying plane. The guide members 16, in this embodiment the guide walls 81A and 81B, extend outwards from the bottom side 15 of the guide modules 11A such that they leave clear the through openings 91 and perpendicular continuations thereof. It is thus provided that during use of the conveyor mat 4 in a pasteurizer, the flow of water through the conveyor mat 4 is impeded as little as possible. Further, the guide walls 81A and 81B are provided, adjacent their end faces 92, with curvatures 93 to facility engagement with the guide 10A.

It is observed that the invention is not limited to the preferred embodiments described hereinabove. Many variants thereof are possible.

For instance, the guide may also be designed as a guide rod. In addition, the conveying track may also comprise wear strips extending according to a herringbone-shaped pattern, while in or adjacent the center of the conveying track, or, respectively, adjacent the edge, there is included a guide or wear strip extending in conveying direction, for guiding the guide members.

Further, the guide members may also be designed as grooves projecting inwards relative to the bottom sides of the guide modules, for instance U-shaped or V-shaped grooves. If desired, the guide projections of guide modules succeeding each other in conveying direction may be arranged on either side of a guide, so that the guide projections of guide modules succeeding each other in conveying direction in each case impede movement of the conveyor mat in an opposite transverse direction. In that case, the guide track is formed by two parallel rows of projections located adjacent each other.

These and other structural variants are understood to be within the framework of the invention as represented in the following claims.

What is claimed is:

1. A conveyor mat for use in conveyer for conveying products in a conveying direction between spaced-apart divert wheels and comprising a conveyer track and a conveyer track guide extending in a conveying direction, said conveyer mat comprising:
   a plurality of rows of modules disposed side-by-side and extending in a direction transverse to said conveying direction, said modules succeeding each other in said conveying direction and forming a conveying face;
   each said modules comprising a top face, a front side in said conveying direction, a rear side disposed opposite said front side, a plurality of front hinge loops disposed on said front side and a plurality of rear hinge loops disposed on said rear side, said top faces of said modules together comprising said conveying face of said conveyer mat;
   a plurality of hinge pins extending through said hinge loops in a direction extending transversely to said conveying direction;
   certain of said modules comprising guide modules, each of said guide modules having a bottom side and a slotted guide member disposed on said bottom side for cooperating with said conveyor track guide, said guide modules being incorporated into said conveyor mat such that said guide members are disposed in substantial alignment in said conveying direction to form a slotted guide track extending in said conveying direction.

2. The conveyor mat in accordance with claim 1, wherein said guide modules are disposed in alignment adjacent at least one of said opposing lateral edges such that said guide members together form a slotted guide track adjacent said at least one of said opposing lateral edges and extending in said conveying direction.

3. The conveyor mat in accordance with claim 1 wherein said guide members are disposed on said guide modules substantially equidistant from said opposing lateral edges, whereby said guide members together form a slotted guide track substantially equidistant from said opposing lateral edges.

4. The conveyor mat in accordance with claim 1 wherein each of said successive rows comprises at least one said guide modules.

5. The conveyor mat in accordance with claim 1 wherein said guide members together constitute a channel extending in said conveying direction and said channel comprises substantially continuously extending channel walls for cooperation with a guide on a conveying track.

6. The conveyor mat in accordance with claim 5 wherein each of said guide members comprises two spaced apart guide walls extending in a direction parallel to said conveying direction and spaced apart in a direction extending transversely to said conveying direction, whereby guide walls of guide modules succeeding each other in a conveying direction form said channel walls.

7. The conveyor mat in accordance with claim 6 wherein said guide walls are staggered in said conveying direction.

8. The conveyor mat in accordance with claim 6 wherein said guide walls having differing lengths in said conveying direction.

9. The conveyor mat in accordance with claim 6 wherein at least one of said guide walls of each of two modules succeeding each other in said conveying direction is provided with a beveled end face extending outwardly from said bottom side of one of said two modules and toward a center portion of one of said two modules.

10. A conveyor mat in accordance with claim 1 wherein said modules are disposed of in a conveying plane and said modules are provided with through openings and through opening extensions disposed in alignment with said through openings and extending substantially transversely to said conveying plane and wherein said guide members project outwardly from said bottom side and are spaced apart from said through openings and said through opening extensions.

11. A conveying apparatus comprising a conveyor mat and a conveying track extending in a conveying direction for supporting said conveyor mat, said conveyor mat comprising:

a conveying face;

a number of successive rows of side-by-side modules exceeding each other in said conveying direction and extending transversely to said conveying direction, said modules, viewed in said conveying direction, each having a front side and a rear side and a plurality of hinge loops disposed on said front side and a plurality of hinge loops disposed on said rear side;

a plurality of hinge pins extending through hinge loops and in a direction extending transversely to said conveying direction;

said top faces of said modules together constituting a conveying face of said conveyor mat;

said conveyor mat further comprising a number of guide modules each having a bottom side provided with guide members for cooperating with at least one guide on a conveyor track;

said guide modules being incorporated into said conveyor mat such that said guide modules are substantially equally spaced from one of said opposing lateral edges, said guide members together constituting a substantially slotted slide track extending in said conveying direction;

said conveying track comprising at least one guide extending in said conveying direction for guiding said guide members of said conveyor mat.

* * * * *